April 26, 1966     T. W. JOHNSON     3,247,879
EXTENSIBLE TUBELESS TIRE BEAD AND
ADJACENT SIDEWALL ANNULUS
Filed Jan. 11, 1965
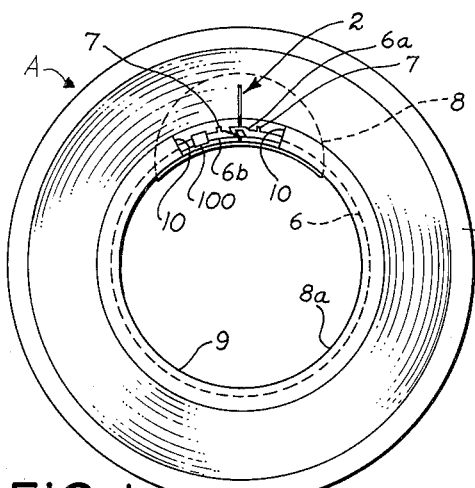
FIG. 1
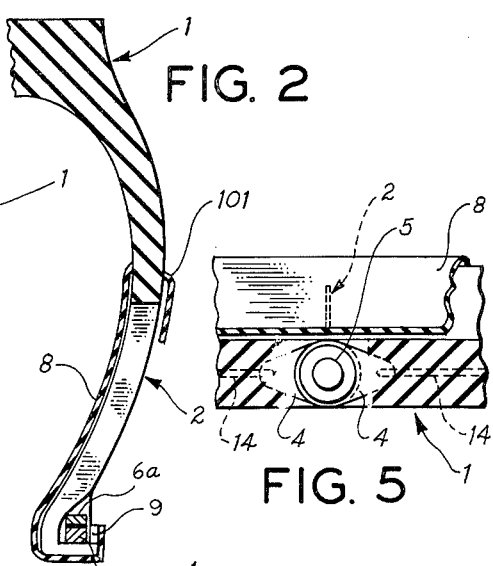
FIG. 2
FIG. 5
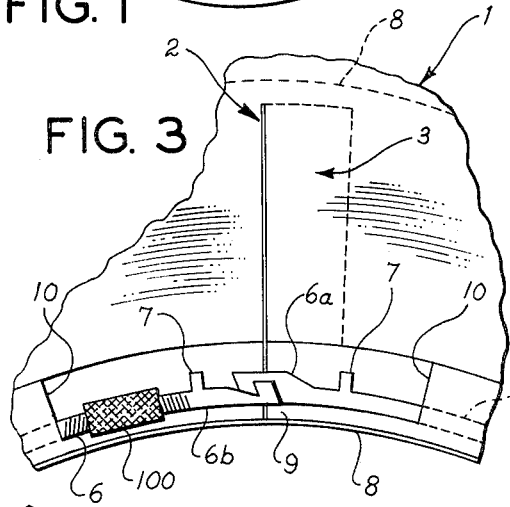
FIG. 3
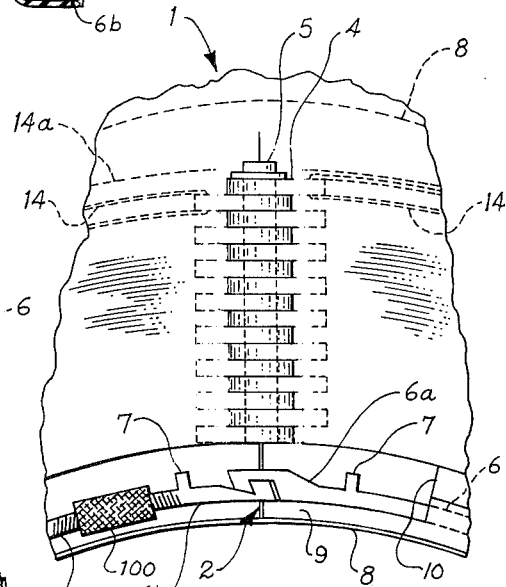
FIG. 4
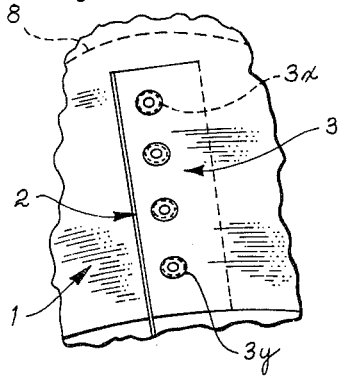
FIG. 3a
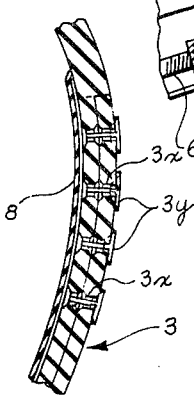
FIG. 3b
INVENTOR.
Tilden W. Johnson

United States Patent Office 3,247,879
Patented Apr. 26, 1966

3,247,879
EXTENSIBLE TUBELESS TIRE BEAD AND ADJACENT SIDEWALL ANNULUS
Tilden William Johnson, 5630 Sawtelle Blvd., Culver City, Calif.
Filed Jan. 11, 1965, Ser. No. 424,746
8 Claims. (Cl. 152—158)

This invention relates to improvements in a tubeless tire to provide higher all-around factors of safety for pneumatic wheel assemblies capped by tubeless tires.

The present invention is an improvement of the construction disclosed in my copending application Serial Number 175,926, now Pat. No. 3,172,447, and relates to construction of an extensible tubeless tire bead and adjacent sidewall annulus whereby a tubeless tire can be stretched over bigger, stronger, and more flexible tire buffers or rim extensions whereby wider, higher, stronger, and more flexible tire buffers and rim extensions can be used inside the tire. Thus present low factors of safety for loads in various directions of pneumatic wheel assemblies can be corrected to prevent tire air loss upsetting the braking system and equilibrium of cars that now causes deaths, injuries and car and highway damages.

After being in a car overturn from a failing front tire, I have discovered the foregoing tire and rim and pneumatic wheel development through the years coupled with constantly advancing car speed limits have resulted in low factors of safety for various road conditions and loads. Further after laboratory tests, road tests, and mathematical analysis, I have discovered it is possible to slit the heretofore inextensible tubeless tire beads and a sidewall annulus so the tubeless tire can be installed over high, wide, and flexible non-pneumatic buffers capable of preventing serious wheel drop in case of air failure. Then after the buffer is inside the tire and rim, the bead and sidewall slit (when circumferential reinforcements terminate in anchors at the slit) can be sealed by inserting a pin from the rim seat of the tire bead so that when installed the pin cannot be removed while in use and the bead and slit annulus become as strong as before slitting. Air seal can be obtained despite the slit by vulcanizing a piece of rubber conforming to tire sidewall and bead form around the slit on the inside of the tire staying a few inches from the slit to provide enough stretch for opening and closing said slit bead and sidewall. This piece of unslit rubber when extended under the tire bead and the bead tensioned to proper compression force causes the tire to operate as a tubeless tire despite the fact its bead and sidewall at one or more places can be opened and closed at will.

It is the object of this invention to construct a tire usable with a pneumatic wheel assembly capable of substantially preventing braking upsets upon loss of tire air and to prevent dirt wedging between the tire and rim in improvised curves causing loss of air and concrete cracks and ridges setting up enough sidewall snatch to cause loss of tire air.

Other objects and advantages of this invention will further become apparent hereinafter and in the drawings in which:

FIGURE 1 shows an elevation view of a typical tire or tubeless tire with a radial slit at one or more places severing the tire bead core and adjacent tire sidewall annulus reinforced area. It also shows the tension fastening and unfastening of the tire bead cable.

FIGURE 2 shows a cross section view of the slitted bead and sidewall construction showing the unbonded air sealing extensible rubber is not slitted and how tire bead wire or cable is exposed at the slitted area for fastening and unfastening by tension. It should be noted FIGURES 1 and 2 show the simplest slit or slot construction. It should be noted, that the vulcanized to the tire though unbonded air sealing unslit extensible rubber may extend the entire circumference of the tire when a number of slits occur, but when only one or two slits occur, then this rubber air seal may be just vulcanized to the tire inside at a distance just sufficient for enough stretchability to permit the slitted bead and sidewall annulus to function properly when a buffer is being installed or removed.

FIGURE 3 shows an enlarged elevation view of the slitted tire bead and sidewall annulus and tension fastening and unfastening of the tire bead cable or wire fastening terminations. It also indicates an alternate method of slit closure by overlapping or dovetailed flaps as indicated by broken lines. In some case, it should be noted, where this radial slit is small or when the slit area presses against an inside buffer, it may be sufficient to just vulcanize the slit section and only refasten the bead cable. It should be noted that as long as tire cross section reinforcement exists a bulge cannot start despite lack of circumferential reinforcement.

FIGURE 3a shows a fragmentary duplicate of FIGURE 3 overlapping or dovetailed flaps at the slit plus holes in the outside flap and rivets or screws in the inside flap to firmly close the slitted area for some types of tires and uses.

FIGURE 3b shows a cross section view of FIGURE 3a and detail of rivets or screws. It should be noted that in some case, it would be more economical to use aircraft rivet staplers to rivet up the overlapped or dovetailed slit sidewall annulus whereby with the tool a rivet can be stuck inside from the tire outside and pulled to a riveted position. This can be done quickly and easily, and when necessary to open, the rivet can be cut with a pair of sidecutters.

FIGURE 4 shows an enlarged fragmentary sidewall elevation view of the slitted area showing an optional method for sealing heavy duty tires slitted area by terminating the circumferential wheel rolling tire reinforcements at the slot with rings or zippers and using a zipper or pin to effect the seal of the slit. It should be noted that the most foolproof procedure would be to insert the closure pin through both the bead cable and the sidewall anchors from the bead seat of the tire bead so after installation the pin could not escape. However, this is only possible when the tire is only opened up for buffer installation and can then be placed in the drop center like ordinary tubeless tires so air inflation pressure will force over the rim tire bead seat. It should be noted a zipper can be used instead of the pin.

FIGURE 5 shows a plan view of construction in FIGURE 4.

Referring to the drawings by letters and numbers:

The letter "A" refers to a typical tire or tubeless tire of the carcass reinforced type and is no part of this invention except as improved to be useable with pneumatic wheel assemblies utilizing wider, higher, stronger, and more flexible inside rim extensions or tire buffers. The numerals will show details of improvement.

Numeral 1 represents a typical carcass reinforced sidewall of a tire or tubeless tire of the two beaded type and is no part of this invention except for improvements as shown by other numerals.

Numeral 2 represents a cut, slit, or slot at one or more places radially across the tire bead, tire cable and needed adjacent sidewall annulus for extensibility purposes. As illustrated it has several variations of construction. It should be noted the word *slit* only refers to severance. When manufactured new, of course, the reinforcement and casing will terminate in vulcanization so as to present a finished manufactured appearance.

Numeral 3 represents an overlap or dovetail construction of the slit terminations.

Numeral 3x represents reinforced holes in the outside ply of the slit overlap or dovetail of 3 through which the rivet or screw 3y can project to seal the slit in use.

Numeral 3y represents a rivet or screw with a cap fastened to the inside reinforced ply overlap to pass item 3x.

Numeral 4 represents an oblong ring shaped termination of wheel rolling tire circumferential reinforcements at the slit or a zipper which can seal the slit by zipper or pin 5.

Numeral 5 represents a zipper handle or pin to seal the reinforced circumferential reinforcements at the slit in some constructions for particular tire uses. In some case it should be noted this pin will be inserted from the bottom of the tire bead through both the bead cable and sidewall anchors in which case its head will resemble a section of bead structure at least through the bead center.

Numeral 6 represents the tire bead wire or cable with fastening and unfastening ends at the slit operated by tension tools. Note this bead hook has an adjusting sleeve or nut with threading opposite on both ends, so it can be turned to adjust the bead cable to enough or proper length so when tong like pliers are placed behind item No. 7 an airtight fit will result from tension just before the hooked ends engage so that after engagement and slack off for tension latching an airtight fit will result. In some cases this sleeve may be integral with one of bead cables hooked ends.

Numeral 7 represents projections on 6 near the slit whereby vice grips or big pliers with slit ends can be inserted behind to tension the tire bead substantially inextensible cable to compress bead core rubber so items 6a and 6b will fasten or unfasten.

Numeral 6a represents the overlap fastening attached to the substantially inextensible tire bead cable at the slit.

Numeral 6b represents the underlap fastening attachment as shown of the tire bead cable at the slit. There are several types of tension fit and screw fit fasteners, no part of this invention, that can be substituted for the tension fastening indicated as necessary on the drawing. The particular fastening shown here requires use of a fastening tool capable of tensioning the cable strap to several hundred or thousands of pounds tension to so over compress tire bead rubber between the tire bead cable and rim seat so that after the hooks engage the pressure can be released to fasten and still leave enough compression in the rubber tire bead between the tire bead cable and rim seat to retain air.

Numeral 8 represents the unslitted inside unbonded rubber air seal passing underneath the slitted tire bead core that forms the air retaining fit. It is obvious that when the tire bead cable is tensioned sufficiently to release the hooked ends of the cable the slit section will enable the tire sidewall to flip open to pass over tire buffers or rim extensions while the rubber in unslit 8 will stretch sufficiently to permit the bead and sidewall annulus extension. It should be noted the air sealing rubber item 8 in case of just one or two tire slits may just be vulcanized to the inside tire just far enough from the slit radially and circumferentially to allow enough item 8 stretchability for the proper function of the slit during buffer installing. When a number of slits exists, then this item 8 will be vulcanized the entire circumference of the tire sidewall at a radial point just above or radially further from the wheel axle center than the greatest capward termination of the slit in the sidewall.

Numeral 8a represents the air sealing rubber between the substantially inextensible tire bead core cable and rim seat that is compressed for airtight fit in the unslit extensible bead tire as shown in FIGURE 1. When item 8 is only extended around an immediate slit area it will also be bonded at the point where it passes under the tire bead so the two blend into one piece without a sudden abrupt overlap in order to better effect tire rim air seal when the bead strap is tensioned.

Numeral 9 represents the tire bead whether slit or unslit and whether standard shape or hooked shape terminating in zippers or rings as shown in FIGURE 1.

Numeral 10 represents the beginning of the exposure of the tire bead cable for installation of hooked ends for fastening near the slit. For about 5 inches the bead of a typical tubeless tire has an open hook shape as shown in FIGURE 2 at the tire bead slit.

Numeral 14 represents circumferential reinforcement in item 14a which reinforcements anchor to anchors item 4.

Numeral 100 is a threaded sleeve or nut for adjusting the length for proper tension in the substantially inextensible tire bead core cable.

Numeral 14a represents vulcanized tire ply containing reinforcements item 14 to which the anchors 4 attach. Thus this ply of carcass reinforcement attached to anchors item 4, is a tire sidewall annulus radially equal to the slits to be closed and is usually bonded as the last outside ply of the tire though it can be placed in the middle of tire plies or even on the inside of the tire though that is an unlikely location. In some cases this annulus 14a containing reinforcements 14 and anchors attached thereto item 4 may only extend a few inches circumferentially from each side of the slit.

Numeral 101 represents a sidewall annulus radially equal to the slit areas or wider made of stretched rubber material suitably bonded to the outside tire casing rubber in a circumference greater than the greatest radial distance of slit capward terminations and tire bead sides so it conceals in a white sidewall like appearance the slit areas.

All items of manufacture have been defined and use stated and the need and useful nature of the invention set forth. This article is manufactured by starting with the usual manufacture of carcass reinforced tubeless tires consisting of plies. After a suitable number of plies are laid out and prepared for forming with normal crown angles of manufacture used all of which is no part of this invention, the product is improved by manufacturing the usual multiply wire substantially inextensible tire bead cable 6 by welding or clamp attaching to each end of said bead cable hooked ends adjustable with a tensioning sleeve or nut 100 and adding lugs 7 to said hooks or bead ends for tong engagement for tensioning. Then said bead cable is rolled as usual or tire carcass plies doubled around said bead cable and at the point said bead cable joining at one or more points said carcass plies circumferential beads and sidewall annulus slit radially the required distance, 2. Then a sidewall annulus 14a circumferentially reinforced with item 14 to which is attached anchors 4 is applied as carcass reinforcement on the outside of one or more tire sidewalls and said slit area closed with pin 5 or like means and said tire carcass cured as is the normal case and suitable inside air sealing rubber added to the tire inside ply and vulcanized sidewalls and cap tread added to said tire. Following this process a sheet of unslit air retaining rubber shaped to applicable tire sidewall and bead shape is vulcanized around all slit areas inside said tire staying a sufficient distance from said slit so said slit when opened can swing back and forth for buffer loading like a door and in case said item 8 does not extend the entire circumference of said tire then said item 8 to be vulcanized at the point where its edges are most distant from said slit tire bead and sidewall to be vulcanized airtight to and around said tire bead taking care for a uniform tire bead rim seat smooth finish for air seal. Following this process then item 101 resembling a white sidewall annulus consisting of stretchable rubber is placed on the sidewall annulus covering all slit areas and bonded to said tire sidewall and beads leaving enough unbonded adjacent to said slit areas to permit said slit areas when said tire cable and sidewall slit areas are open for buffer loading to swing back and forth like doors or somewhat similar thereto.

Thus following manufacture with the beads and sidewall slits pinned or aircraft like riveted and said items 8 and 101 in place said tire looks and performs as a normal tubeless tire. To use this product on normal drop center rims, the tire is installed and inflated in the same manner as a regular tubeless tire so as to seat both beads against the rim retaining flanges. Then the openable sidewall and bead are forced into the drop cener and removed for buffer loading. The pin or its equivalent is removed or rivet heads cut off with sidecutters and the tire opened up and a suitable high, wide and flexible buffer installed. Said suitable buffer can easily pass by flexing into an oblong shape into the opened tire bead and sidewall and it is possible to leave one tire bead seated as aforesaid and stretch the other bead laterally about 14 inches open permitting the buffer to pass over the tire rim retaining flange and to be forced over the rim tire retaining flange by pushing the tire sidewall of the seated tire bead over the rim flange tightly between said rim flange and said buffer base until it is possible to force the now repinned tire bead and sidewall into the drop center for tire installation and inflation as a tubeless tire enclosing a suitable protective buffer. As inflation occurs the tightening sidewall over which the buffer was forced will force the buffer back against the opposite sidewall until a projection on said buffer or its equivalent catches on the opposite sidewall still leaving some buffer base located over the tire on top of the rim tire retaining flange. Then a lug or auxiliary rim can be fastened to the outside rim tire retaining flange preventing said buffer again passing over said tire over said rim tire retaining flange, leaving the buffer firmly locked in position inside the tire.

To disassemble, remove the auxiliary rim and use sidewall pressure to the deflated tire to force said buffer again over the tire retaining flange having said auxiliary rim attachment and force the tire sidewall into the drop center of the rim and remove from the rim. Then unpin or its equivalent the tire bead and sidewall and remove the buffer and then finish removing the tire from the rim. Experienced help with proper tools can thus assemble and disassemble said tire and adequate buffer almost as fast as a tubeless tire or within two or three minutes more time for a greatly increased all-around factor of wheel safety.

When, the tension latching type bead is used, the tire and buffer are forced into position and the openable tire bead located on the proper rim bead seat and tensioned to a close as fast as installing a tubeless tire alone.

From the foregoing it is apparent I have invented improvements in tires and tubeless tires of the extensible tire bead and annulus type whereby all the advantages of normal tubeless tire manufacture is retained but by slitting at one or more places radially the tire beads and tire bead cores cables and adjacent sidewall annulus said normal tubeless tires can be stretched over rim extensions or tire buffers located on rims inside the tubeless tire covering so that such buffers or rim extensions can be constructed of adequate width, height, flexibility and strength to prevent loss of car operation equilibrium and braking efficiency.

Several embodiments have been described varying to rim type used and inflation pressure and tonnage of vehicle used. The preferred embodiment therefore is that most adapted to the class of use.

Having now described and illustrated one form of my invention and species thereof, I wish it to be understood that my invention is not to be limited to the specific form or arrangement of parts herein described and shown, or specifically covered by my claims.

The detailed description of the particular embodiments of the invention illustrated and described herein is not to be construed as limiting the invention thereto. The invention includes all features of patentable novelty residing in the foregoing description and the accompanying drawings.

I claim:

1. An open beaded pneumatic tire comprising a tread and sidewalls, said sidewalls terminating in beads, each of said beads having a rim contacting surface and a substantially inextensible bead core reinforcement substantially enclosed in said bead characterized by having in combination one or more of said beads, bead core reinforcement and adjacent sidewall annulus transversely slit at one or more places, said slit made airtight by a rubber covering conforming to inside tire sidewall shape and adjacent bead said rubber sheet vulcanized to said inside tire sidewall and bead rim contacting surface at a distance from said slit sufficient to permit said slit to fully allow said sidewalls to swing open permitting a buffer of greater circumference than said tire bead to pass said slit bead and sidewall annulus, said substantially inextensible bead core reinforcement having means to secure said tire to an airtight fit to a wheel rim.

2. A tire as in claim 1 further characterized by means to prevent said inside rubber covering said slit sidewall annulus from being visible through said sidewall annulus slit after tire inflation.

3. A tire as in claim 1 further characterized by means for carcass reinforcing said tire from said bead to said bead on the opposite side circumferentially, diagonally and cross sectionwise.

4. A tire as in claim 1 further characterized by means for concealing from outside view the presence of said slits in said beads, inextensible bead core reinforcements and adjacent sidewall annulus.

5. A tire as in claim 1 further characterized by said slitted sidewalls terminating in oblong ring shaped anchors with holes therein, said ring shaped anchors to be joinable by a pin or wire inserted through said holes in said anchors.

6. A tire as in claim 1 further characterized by said slitted sidewalls terminating in zippers capable of zippering to a joined seal.

7. A tire as in claim 1 further characterized by said slits terminating in overlapping flaps or one end dovetailed into the adjoining end recess.

8. A tire as in claim 1 further characterized by said slits overlapping with rivets or screw fastened to the inside flap and a reinforced hole in the outside flap through which said rivet can pass and be snapped fitted in place or have a cap screwed thereon.

No references cited.

ARTHUR L. LA POINT, *Primary Examiner.*

C. W. HAEFELE, *Assistant Examiner.*